3,067,258
PROCESS FOR PREPARING ORGANIC PHOSPHINE OXIDES AND OLEFINS
Martin Grayson, Norwalk, and Patricia Tarpey Keough, Ridgefield, Conn., assignors to American Cyanamid Company, New York, N.Y., a corporation of Maine
No Drawing. Filed June 14, 1961, Ser. No. 116,986
6 Claims. (Cl. 260—606.5)

The present invention relates to the preparation of tertiary phosphine oxides and unsaturated hydrocarbons. More particularly, the instant discovery concerns organophosphorus compounds of the formula

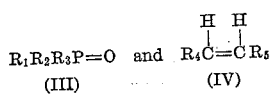
(III)        (IV)

prepared by reacting a cyclic carbonic acid ester of the formula

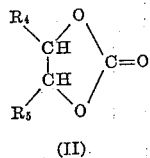
(II)

with a tertiary phosphine of the formula $$R_1R_2R_3P$$
(I)

The symbols in the above formulae have the following meanings:

$R_1$ through $R_3$ each represents substituted and unsubstituted, branched and straight chain alkyl having from 1 to 20 carbon atoms, substituted and unsubstituted, branched and straight chain alkenyl having from 1 to 20 carbon atoms substituted and unsubstituted cycloalkyl, such as cyclohexyl and cyclopentyl, substituted and unsubstituted cycloalkenyl, substituted and unsubstituted mononuclear and dinuclear aryl, such as phenyl and naphthyl;

$R_4$ represents hydrogen, branched and straight chain, substituted and unsubstituted alkyl having from 1 to 16 carbon atoms;

$R_5$ represents hydrogen, branched and straight chain, substituted and unsubstituted alkyl having from 1 to 16 carbon atoms and cycloaliphatic, the sum of $R_4$ and $R_5$ carbon atoms being in the range of 0 to about 16 carbon atoms, and said substituents for said alkyl moieties which $R_4$ and $R_5$, respectively, represent being, typically, hydroxy, cyano, lower alkoxy (e.g., ethoxy, butoxy), and other like substituents which under the conditions of the reaction contemplated herein do not interfere to any substantial degree with the preparation of the desired tertiary phosphine oxides and/or olefins.

A typical embodiment of the instant discovery follows:

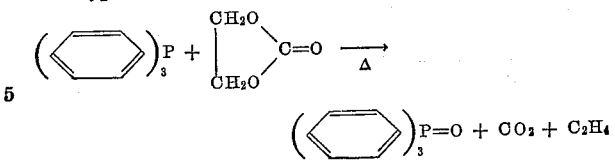

The reactions contemplated herein are generally carried out at a temperature of about 50° C. to about 300° C., preferably 150° C. to 250° C. when $R_4$ and $R_5$ are other than hydrogen. Likewise, these reactions may be carried out at atmospheric, super-atmospheric or sub-atmospheric pressures, preferably atmospheric pressure.

It has been found, pursuant to the instant discovery, that certain catalysts enhance the reaction. Many and varied catalysts are suitable, such as metallic copper powder, inorganic and organic bases. Typical inorganic bases are alkali and alkaline earth metal hydroxides or carbonates, and the like, such as NaOH, KOH, LiOH, $Ca(OH)_2$, $Ba(OH)_2$, $NH_4OH$, $Mg(OH)_2$, $Na_2CO_3$, $CaCO_3$, $K_2CO_3$, CaO, etc. Typical organic bases are the trialkyl amines, such as triethylamine and tributylamine, heptamethylbiguanide, lutidine, substituted ammonium hydroxide (e.g. $C_6H_5CH_2N^+(CH_3)_3OH^-$ benzyltrimethyl ammonium hydroxide), etc.

The tertiary phosphine reactants of the present invention react with the cyclic carbonate esters in stoichiometric quantities, i.e., 1 molar equivalent of tertiary phosphine with 1 molar equivalent of cyclic carbonate ester, as illustrated in the specific embodiment provided just above. Nevertheless, an excess of either reactant relative to the other may be employed successfully; preferably, an excess of the phosphine reactant relative to the cyclic carbonate ester is employed if an excess is used. The sequence of addition of these reactants is not critical.

Typical tertiary phosphine reactants within the purview of the instant discovery, which correspond to Formula I, above, are: trimethylphosphine, triethylphosphine, tributylphosphine, trioctylphosphine, tridodecylphosphine, trioctadecylphosphine, triphenylphosphine, phenyldiisobutylphosphine, cyclohexyldidoecylphosphine, naphthylbis(3 - hydroxypropyl)phosphine, 4 - chlorophenylbis(3-ethoxypropyl)phosphine, tris(4-methoxyphenylphosphine, and the like.

It follows from this list that substituents contemplated for R, $R_1$ and $R_2$ above are lower alkoxy, hydroxy, halogen (e.g. chloro, bromo, iodo), and other like substituents which are non oxidizing under the conditions of the reaction.

Typical cyclic carbonic ester reactants useful herein are ethylene carbonate, propylene carbonate, phenylethylene carbonate, 6-ethoxy-1,2-hexylene carbonate, 6-cyano-1,2-hexylene carbonate, 3-butoxy-1,2-propylene carbonate, 2,3-butylene carbonate, 1,2-cyclohexylene carbonate, cyclohexylethylene carbonate, and the like.

If desired, reactions of the type contemplated herein may be carried out in the presence of an inert organic solvent. Typical solvents are aliphatic alcohols, such as isopropanol, n-butanol, n-octanol, and other similar solvents which under the conditions of the reaction do not react with the reactants or their product.

The present invention will best be understood from the following examples:

TABLE I

| Example | Reactants | | Reaction Conditions | | | Products | |
|---|---|---|---|---|---|---|---|
| | Phosphine | Carbonate | Temperature, °C | Solvent | Catalyst | Phosphine Oxide | Olefin |
| I | $(C_6H_5)_3P$ | ethyelne | 190–210 | None | None | $(C_6H_5)_3P=O$ | $H_2C=CH_2$ |
| II | $(C_6H_5)_3P$ | propylene | 230 | ---do--- | ---do--- | $(C_6H_5)_3P=O$ | $H_3C\overset{H}{\underset{H}{C}}=CH_2$ |
| III | $(C_6H_5)_3P$ | phenylethylene | 250–260 | ---do--- | hydroquinone | $(C_6H_5)_3P=O$ | styrene. |
| IV | $(C_6H_5)_3P$ | ---do--- | 250–260 | ---do--- | $K_2CO_3$ | $(C_6H_5)_3P=O$ | Do. |
| V | $(C_6H_5)_3P$ | ---do--- | 285 | ---do--- | Cu | $(C_6H_5)_3P=O$ | Do. |
| VI | $(C_4H_9)_3P$ | ---do--- | 140–220 | ---do--- | None | $(C_4H_9)_3P=O$ | Do. |

TABLE II

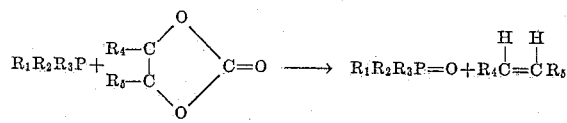

$$R_1R_2R_3P + \begin{array}{c} R_4-C \\ R_5-C \end{array}\Big\rangle\!\!\begin{array}{c}O\\ \\ O\end{array}\!\!\Big\rangle C=O \longrightarrow R_1R_2R_3P=O + R_4\overset{H}{C}=\overset{H}{C}R_5$$

| Example | Reactants | | | Reaction Conditions | | |
|---|---|---|---|---|---|---|
| | Phosphine | Carbonate | | Temperature, °C | Solvent | Catalyst |
| | | $R_4$ | $R_5$ | | | |
| VII | $(CH_3)_3P$ | $C_2H_5O(CH_2)_4$— | H | 85 | None | Cu |
| VIII | $(C_2H_5)_3P$ | NC—$(CH_2)_4$— | H | 135 | ---do--- | Cu |
| IX | $(C_4H_9)_3P$ | $CH_3$— | H | 190 | ---do--- | None. |
| X | $(C_{12}H_{25})_3P$ | H | H | 255 | ---do--- | $CaCO_3$ |
| XI | $(C_{18}H_{37})_3P$ | H | H | 290 | ---do--- | None. |
| XII | $C_6H_5P(iso-C_4H_9)_2$ | $C_2H_5O(CH_2)_4$— | H | 250 | ---do--- | CaO |
| XIII | $(C_6H_{11})P(C_{12}H_{25})_2$ | NC—$(CH_2)_4$— | H | 250 | ---do--- | heptamethylbiguanide. |
| XIV | $C_{10}H_7P(CH_2CH_2CH_2OH)_2$ | $C_4H_9OCH_2$— | H | 220 | ---do--- | $(C_4H_9)_3N$ |
| XV | Cl–⟨phenyl⟩–P(CH_2CH_2\overset{H}{C}OC_2H_5)_2 | $CH_3$— | $CH_3$ | 260 | ---do--- | $CH_3O$–⟨phenyl⟩–OH |
| XVI | $(CH_3O$–⟨phenyl⟩$)_3P$ | $C_6H_{11}$— | H | 253 | $n$-$C_{14}H_{30}$ | $C_6H_5CH_2N^+(CH_3)_3OH^-$ |
| XVII | $(C_8H_{17})_3P$ | —$CH_2CH_2CH_2CH_2$— | | 259 | $(C_6H_5)_2O$ | NaOH |

The equation in Table II is self-explanatory. For instance, the products of Example X are $(C_{12}H_{25})_3P=O$ and $H_2C=CH_2$.

The examples in Tables I and II, above, are carried out by mixing the tertiary phosphine reactant at room temperature under nitrogen with the cyclic carbonate reactant, the reaction stoichiometry being a 1:1 ratio of phosphine to carbonate. This mixture is heated and an evolution of gas takes place. When this evolution subsides, the reaction mixture is cooled, washed with cold water to remove unreacted carbonate and extracted with benzene or chloroform, or the like. The phosphine oxides are identified by melting point and by infrared analysis. The lower molecular weight (gaseous) olefins are collected over water in a gas burette and yields of olefin are determined by mass spectrometric analysis of the gases evolved during reaction. The higher molecular weight olefins are distilled from the reaction mixture, purified by the usual organic techniques and identified by infrared microanalytical analysis.

The tertiary phosphine oxides of the present invention are useful as gasoline additives. For example, up to about 10 milliliters of any one of these oxides, when dissolved in one gallon of gasoline, affords protection against misfiring, surface ignition, and the like.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:

1. A method of preparing organophosphorus compounds and olefins of the formulae, respectively $$R_1R_2R_3P=O \quad \text{and} \quad R_4\overset{H}{\underset{|}{C}}=\overset{H}{\underset{|}{C}}R_5$$
$$\text{(III)} \qquad\qquad \text{(IV)}$$

which comprises bringing together in intimate contact a tertiary phosphine of the formula $$R_1R_2R_3P$$
$$\text{(I)}$$

and a cyclic acid ester of the formula

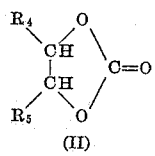

(II)

at a temperature in the range of 50° C. to 300° C.; the symbols in the above formulae having the following meanings:

$R_1$, $R_2$, and $R_3$ each represent a member selected from the group consisting of branched and straight chain alkyl having from 1 to 20 carbon atoms, substituted branched and straight chain alkyl having from 1 to 20 carbon atoms, branched and straight chain alkenyl having from 1 to 20 carbon atoms, substituted branched and straight chain alkenyl having from 1 to 20 carbon atoms, cycloalkyl, substituted cycloalkyl, cycloalkenyl, substituted cycloalkenyl, aryl and substituted aryl; said substituents for alkyl, alkenyl, cycloalkyl, cycloalkenyl and aryl being non-oxidizing under the conditions of the reaction;

$R_4$ represents a member selected from the group consisting of hydrogen, branched and straight chain alkyl having from 1 to 16 carbon atoms and substituted branched and straight chain alkyl having from 1 to 16 carbon atoms;

$R_5$ represents a member selected from the group consisting of hydrogen, branched and straight chain alkyl having from 1 to 16 carbon atoms, substituted branched and straight chain alkyl having from 1 to 16 carbon atoms, cycloalkyl, and substituted cycloalkyl, the sum of $R_4$ and $R_5$ being in the range of about 0 to about 16 carbon atoms, and said substituents for $R_4$ and $R_5$ being substantially inert under the conditions of the reaction.

2. The process of claim 1 wherein the tertiary phosphine is triphenylphosphine and the carbonate is ethylene.

3. The process of claim 1 wherein the tertiary phosphine is triphenylphosphine and the carbonate is propylene.

4. The process of claim 1 wherein the tertiary phosphine is triphenylphosphine and the carbonate is phenylethylene, copper being used as a catalyst.

5. The process of claim 1 wherein the tertiary phosphine is tributylphosphine and the carbonate is phenylethylene.

6. The process of claim 1 wherein the substituents for $R_1$, $R_2$ and $R_3$ are non-oxidizing under the conditions of the reaction and are selected from the group consisting of lower alkoxy, hydroxy, and halogen; and the substituents for $R_4$ and $R_5$ are substantially inert under the conditions of the reaction and are selected from the group consisting of hydroxy, cyano and lower alkoxy.

No references cited.